Feb. 17, 1948. W. H. BASELT 2,436,136
DISC BRAKE FOR RAILWAY VEHICLES
Filed June 12, 1944 2 Sheets-Sheet 1

INVENTOR.
Walter H. Baselt,
BY
Atty

Feb. 17, 1948.  W. H. BASELT  2,436,136
DISC BRAKE FOR RAILWAY VEHICLES
Filed June 12, 1944  2 Sheets-Sheet 2
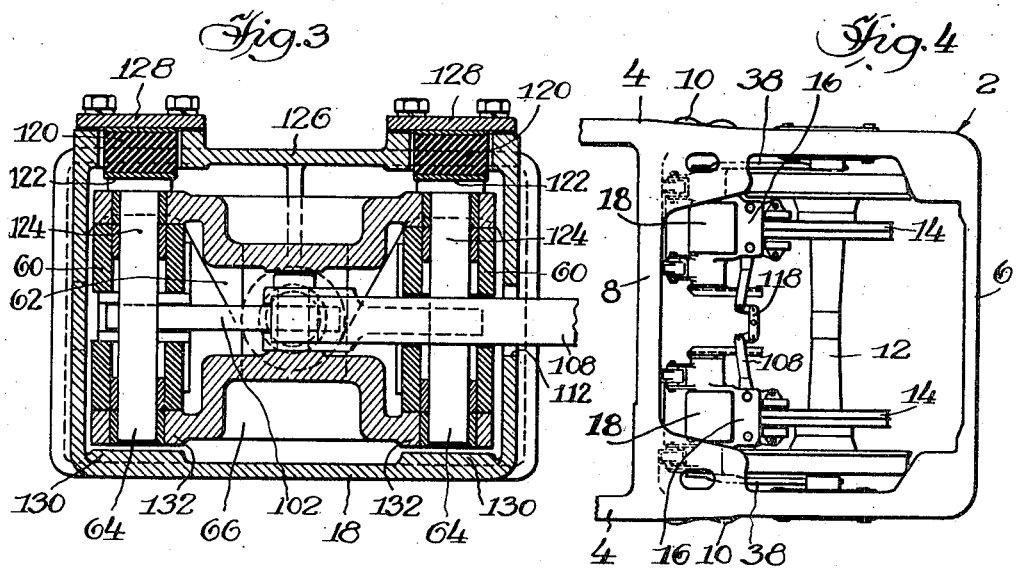
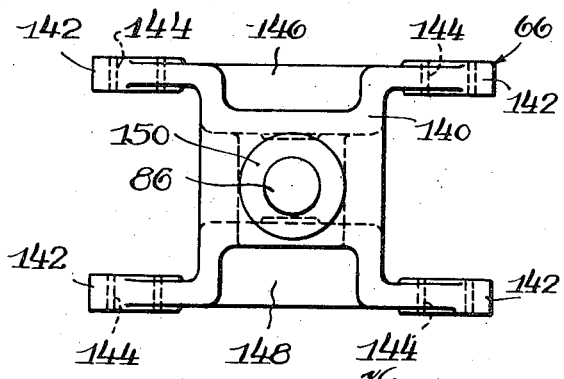
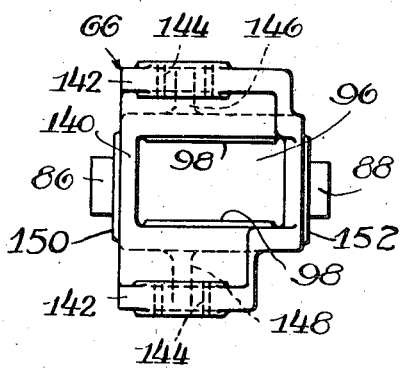
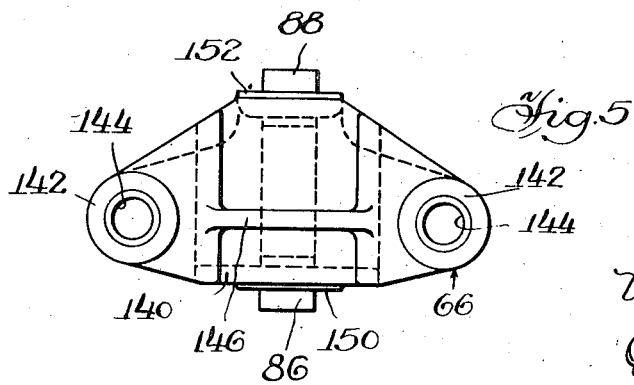
INVENTOR.
Walter H. Baselt
BY
Quinn O. B. Garner, Atty.

Patented Feb. 17, 1948

2,436,136

UNITED STATES PATENT OFFICE 2,436,136

DISC BRAKE FOR RAILWAY VEHICLES

Walter H. Baselt, Chicago, Ill., assignor to American Steel Foundries, Chicago, Ill., a corporation of New Jersey Application June 12, 1944, Serial No. 539,885

20 Claims. (Cl. 188—59)

My invention relates to railway brake equipment and more particularly to a well known type of so-called off wheel brakes wherein one or more rotating discs may be associated with each wheel and axle assembly and means provided for braking on the surfaces thereof instead of on the wheel proper.

The general object of my invention is to devise such an arrangement wherein independent braking means may be provided for each such rotating disc. For convenience, my invention is illustrated as applicable to a four wheel truck in which a rotating disc is mounted adjacent each wheel of the two supporting wheel and axle assemblies.

A different object of my invention is to provide such an arrangement as that described wherein the braking means for each disc may be supported on the truck frame at two spaced points and may have a torque arm associated therewith and eccentrically bearing at its extremity on journal means associated with the adjacent end of the wheel and axle assembly.

In such a truck structure it is well understood that the truck frame is commonly spring supported from an equalizing arrangement seated on the journal ends of the supporting wheel and axle assemblies. As a result, the truck frame has relative vertical movement with respect to the wheel and axle assemblies and provision must therefore be made for maintaining a proper alignment between the braking means supported from the truck frame with the brake discs on the wheel and axle assemblies in view of the relative motions that take place therebetween. This situation is well understood in the art. It is a general object of my invention to provide novel means of affording proper alignment between the brake parts supported on the truck frame and the rotating disc carrying the surface to be braked.

My invention contemplates an independent mounting of braking means for each such disc to be braked so that varying conditions at different parts of the truck structure may adequately be met.

My invention comprehends such a structure as that described wherein braking means may be supported from the truck structure adjacent each wheel for engagement with a brake disc supported for rotation with said wheel and wherein said braking means may comprise a housing for power means and associated levers extending therefrom and supporting brake shoes for engagement with opposite sides of such disc, and further, wherein hand brake means may be associated with each braking means and so arranged as to permit cooperative actuation of hand brake means at opposite sides of each wheel and axle assembly.

My invention further contemplates such braking means wherein said housing may support a pivoted fulcrum therein for a plurality of brake shoe actuating levers as well as for an associated hand brake lever, said pivoted fulcrum being capable of such relative movement with respect to said housing as may permit said shoe carrying levers to have proper alignment.

My novel brake supporting arrangement is bi-symmetrical and so constructed as to permit its application at any portion of the car truck on either side or at either end thereof as may be more particularly described hereafter.

In the drawings,

Figure 3 is a transverse sectional view through the brake structure illustrated in Figures 1 and 2, the section being taken approximately in the vertical plane indicated by the line 3—3 of Figure 1.

Figure 4 is a top plan view of much reduced size, showing the application of my novel braking means to a four wheel railway car truck, only one end of the truck being shown inasmuch as the arrangement is the same at opposite ends.

Figures 5, 6 and 7 show my novel form of pivotal fulcrum block, Figure 5 being a top plan view thereof, Figure 6 a front elevation taken from the bottom as seen in Figure 5, and Figure 7 an end view taken from the right as seen in Figure 6.

Figure 1:
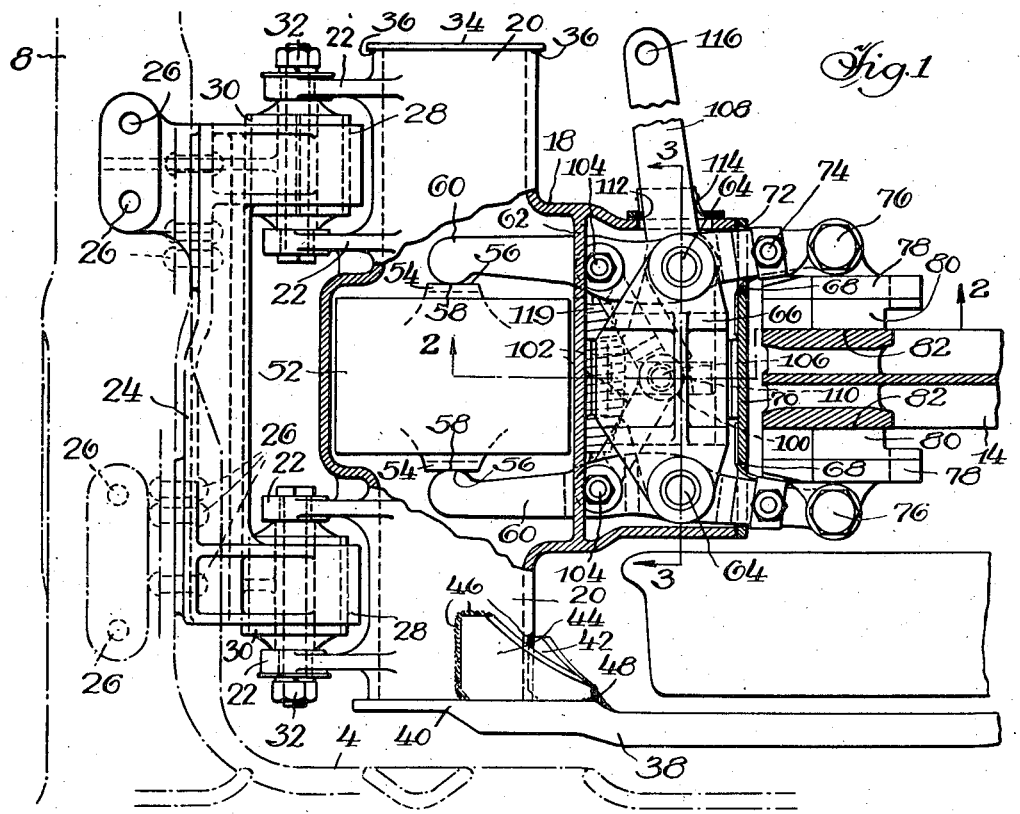
Figure 1 is a top plan view illustrating my novel brake arrangement as applied to one corner of a four wheel railway car truck, a portion of the top of the housing being cut away in order to illustrate more clearly the structure therein.

Describing the structure in detail and referring first to the general arrangement as illustrated in Figure 4, the car truck, generally designated 2, may be of conventional form and may comprise the usual frame with integral side rails 4, 4, end rails 6, 6, and spaced intermediate transoms 8, 8, between which may be supported for lateral motion a bolster on which the car body may be mounted in usual manner. The side frame may be spring-mounted as at 10, 10 on equalizers (not shown) and the ends of said equalizers may be mounted in conventional manner on the journal ends (not shown) of spaced wheel and axle assemblies 12, 12. On each wheel and axle assembly may be mounted a brake drum or disc 14 adjacent each wheel thereof, and braking means, generally designated 16, may be mounted on the transom of the truck frame adjacent each disc 14 for support of brake shoes in engagement therewith, all as more particularly described hereafter.

Figure 2:
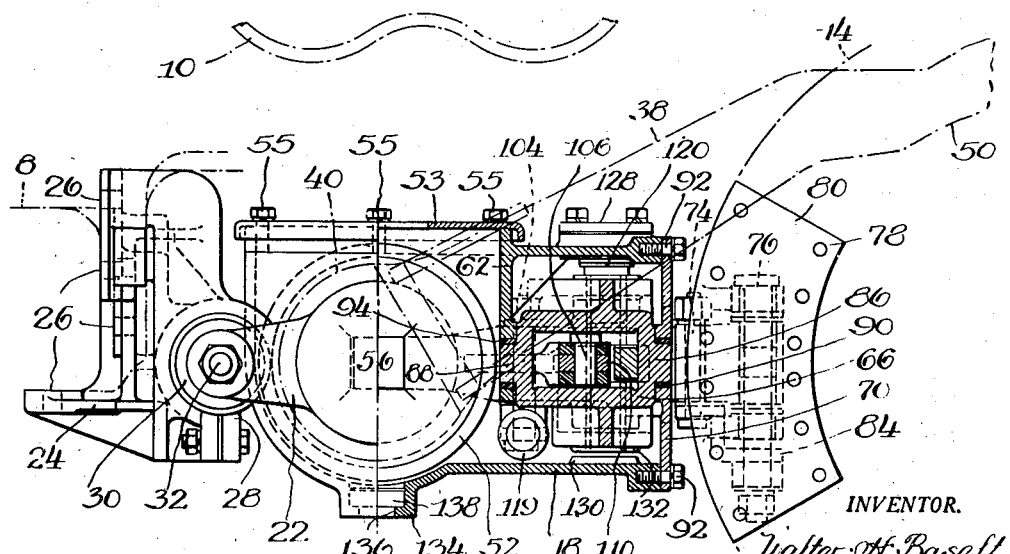
Figure 2 is a side elevation of the structure shown in Figure 1, partly in section, the section being taken approximately in the longitudinal vertical planes indicated by the line 2—2 of Figure 1 with the power means in elevation and the torque arm and brake disc shown in phantom lines.

Referring now to the detail of my novel brake structure as illustrated in Figures 1 to 3, the housing 18 may have tubular portions 20, 20, at opposite sides thereof affording support means for said housing through the medium of spaced arms 22, 22 on each of said tubular members 20, all of said arms being aligned and each pair of arms having a connection at one end of the bracket 24 which may be secured as at 26, 26 to the adjacent transom 8 adjacent its juncture with the side rail 4. The bracket 24 may have at each end thereof a clamping arm 28 defining a transverse cylindrical opening in alignment with a similar opening in the arm 28 at the opposite end of the bracket, each of said openings affording a convenient mounting for the resilient member or built up bushing 30, which may be a laminated structure of well known form mounted within the adjacent bracket 24 and resiliently supporting the bolt and nut assembly 32, opposite ends of which may be secured to the spaced lugs 22, said connection being such as to permit relative lateral, longitudinal or torsional movement of the housing 18 with respect to the supporting bracket 24. The housing 18 and the braking parts mounted therein are bi-symmetrically arranged for mounting at either side of the truck, the remote ends of the cylindrical portions 20, 20 accommodating respectively a closure plate 34, which may be welded thereto as at 36, 36, and a torque arm 38. The said torque arm 38 may have a base portion 40 convenient for closing the end of the adjacent portion 20 of the housing and may be additionally secured with respect to said housing by angularly arranged brackets 42 and 44, which may be welded to said housing as at 46 and to said torque arm as at 48. The torque arm 38 may project angularly upwardly and the remote end thereof may overlie the journal box (not shown) mounted on the end of the adjacent wheel and axle assembly and eccentrically seated against said box as at 50 in manner comparable to that well known in the art and described in detail in Tack Patent No. 2,355,120, for Rotor brake, issued August 8, 1944. It will thus be seen that the housing 18, which carries the brake mechanism, is afforded three-point support on the spaced aligned arms 28, 28 of the bracket 24 and by the extremity of the torque arm 38 which is eccentrically seated on the journal means at the end of the adjacent wheel and axle assembly.

Intermediate the portions 20, 20 the housing may be enlarged to afford a recess for the double-acting cartridge type cylinder or power means 52 and said recess may be closed by the cover plate 53 (Figure 2) secured as at 55, 55. From opposite ends of the cylinder 52 may project pistons 54, 54, each piston affording a flat face as at 56 for engagement as at 58 with the adjacent end of the substantially horizontally arranged brake lever 60, said brake lever presenting an arcuate surface for engagement with said flat face 56, as clearly seen in the top plan view of Figure 1.

The housing 18 may have an intermediate transverse wall 62 along the upper portion thereof, and each lever 60 may extend beneath said wall for pivotal connection as at 64 with the fulcrum block 66 and project therebeyond through the adjacent opening 68 of the front cover plate 70, each opening 68 being made weather-tight by flexible closure means 72 fixed as at 74 to the adjacent lever. At the projecting end of each lever 60 may be pivotally mounted as at 76 a brake head 78 supporting a brake shoe 80 for engagement as at 82 with one annular face of the adjacent brake drum or disc 14, said drum being shown in section in the view of Figure 1 where said last-mentioned parts are clearly set forth. The pivotal connection at 76 between each lever 60 and the associated brake head 78 may be provided with balancing means 84 (Figure 2), said balancing means also having pivotal connection to said lever arm at the pivot point 74, and being of the form more particularly described and set forth in Tack Patent No. 2,380,803, for Brake head balancing device, issued July 31, 1945.

The fulcrum block 66 is afforded trunnions 86 and 88 (Figure 2) at opposite ends thereof, and said trunnion 86 may be bushed as at 90 within the front closure plate 70, which may be bolted as at 92, 92 to the housing 18 while the trunnion 88 may be bushed as at 94 in the lowermost portion of the before-mentioned transverse wall 62 within said housing. The fulcrum block 66 is a boxlike structure, shown in detail in Figures 5, 6 and 7, and may be seen to have a central transverse opening 96 (Figure 7) of rectangular form, the top and bottom walls of which may be formed with finished pads 98, 98 affording seats or bearings for the knee portion 100 of the toggle 102, the extremities of the opposite arms of which may be pivotally connected as at 104, 104 (Figure 1) with respective brake levers 60, 60, said arms being pivotally connected to each other as at 106. The inner camlike end of the hand brake lever 108 may have bearing as at 110 (Figure 2) against said knee 100 of the toggle 102, and said lever 108 may be fulcrumed intermediate its ends within said housing at the pivot point 64 (Figure 1), said lever projecting through the opening 112 in the side wall of the housing 18 formed therein for that purpose. The opening 112 may be sealed by the flexible closure means 114 and the extremity of the hand brake lever 108 may have pivotal connection as at 116 to the equalizer 118 (Figure 4) so that actuation of said equalizer will operate the hand brake mechanisms associated with the braking means 16 at opposite sides of the wheel and axle assembly.

Release means for the brake mechanism may be provided in the form of a contractile spring 119 (Figures 1 and 2) having its opposite ends connected respectively at the pivot points 104, 104 where the toggle 102 is likewise connected between the brake levers 60.

The trunnion mountings 86 and 88 of the fulcrum block 66 permit said block to rock within the housing 18 but such rocking is restrained by resilient pads or blocks 120, 120 (Figure 3) which bear as at 122, 122 against the tops of the pivot pins 124, 124 which serve as connecting means between said block and the respective brake levers 60, 60. Said blocks 120, 120 may be housed in cavities in the top wall 126 of said housing 18 and confined therewithin under predetermined compression by closure caps 128, 128. A limit to the turning movement or rotation of the fulcrum block 66 is provided by the raised seats or pads 130, 130 on the bottom wall of the housing 18, which may have cooperative engagement with opposed pads 132, 132 on the bottom of the fulcrum block 66.

At the bottom of the housing 18 (Figure 2) may project a hollow lug 134 having an opening 136 to the atmosphere, permitting such "breathing" within said housing as may be necessary under operating conditions, and said hollow lug may afford a recess as at 138 for air straining means (not shown) which may be confined therewithin.

The pivoting fulcrum block 66 is shown in detail in Figures 5, 6 and 7 wherein it may be observed to be a casting of skeletal form having a central rectangular body portion 140 with a pair of laterally projecting lugs 142, 142 at each side thereof, the lugs of each pair having aligned openings 144, 144 therein affording convenient connection for the before-mentioned brake lever supporting pivot pins 124, 124 (Figure 3). The junctures of the lugs 142, 142 with the body portion 140 may be reinforced by aligned ribs 146 and 148 extending respectively between the lugs at the top and bottom of said casting. The before-mentioned rectangular opening 96 extending through the central body portion 140 of the casting accommodates the toggle 102 and the projecting cam end of the hand brake lever 108, as already described, while the raised pads 98, 98 on the top and bottom walls of the opening 96 afford guide means therefor. At the front of the casting may be formed a finished boss 150 from which may project the before-mentioned trunnion 86 while at the rear of said casting may be formed a similar boss 152 from which may project the aligned trunnion 88, said finished bosses 150 and 152 being closely fitted within the cooperating bosses on the cover plate 70 and the intermediate wall 62 of the housing, as well shown in Figure 2. By this means the fulcrum casting is permitted a tilting action on said trunnion within predetermined limits within said housing, as already described.

In operation, it will readily be understood that actuation of the power means 52 will cause the pistons 54, 54 to move away from each other, causing the inboard and outboard brake levers 60, 60 to rotate in clockwise and counterclockwise directions, respectively, about the pivot points 64, 64, thus causing the brake shoes 80, 80 supported at the corresponding ends of said levers, to bear against the opposite braking faces of the disc 14. Release of the power means will permit the release spring 119 to reverse the movement of the levers, and the brake head balancing means will then maintain the brake shoes in spaced relation with respect to said disc. In the case of hand operation, rotation of the hand brake lever 108 in a clockwise direction (Figure 1) about the pivot 64 will cause the cam end thereof to engage at 110 the knee of the toggle 102, thus forcing the levers 60, 60 in opposite directions to apply the brakes. Again, release of the hand brake lever 108 will permit the release spring 119 to restore the brake levers to normal position.

It will be understood that the resilient bushings 30, 30, which serve to connect each housing 18 with the supporting frame bracket, will permit some relative lateral, longitudinal and torsional movement of said housing with respect to said frame. At the same time, it will also be understood that the pivoted fulcrum block 66 will substantially increase the amount of relative twisting or torsional movement permitted between the unsprung brake disc on the wheel and axle assembly and the housing 18, which, of course, is connected to the spring-mounted truck frame.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a supporting wheel and axle assembly having a rotating member with radial braking faces, a truck frame supported from said assembly, and braking means comprising a housing supported from said frame with a torque arm connected to said assembly, and brake rigging within said housing including a fulcrum block pivoted therein, power means, a pair of brake levers fulcrumed at opposite ends of said block, operatively connected to said power means at corresponding ends and projecting from said housing and supporting braking elements for engagement with said faces, and release means connected between said levers at points intermediate their fulcrums and power connections.

2. In a railway car truck, a wheel and axle assembly, a truck frame spring-supported therefrom, brake discs with radial braking faces on said assembly adjacent each wheel, brake means for each disc comprising a housing connected to said frame for relative lateral, longitudinal and torsional movement with respect thereto, said housing having a torque arm connected to said assembly, a fulcrum block pivoted in said housing, a plurality of levers fulcrumed from said block, power and hand means for actuating said levers, said hand means including an auxiliary lever pivoted at one of said fulcrum points, and an operative connection between the auxiliary levers associated with respective housing.

3. In a railway car truck, a wheel and axle assembly, a truck frame supported therefrom, brake discs with radial braking faces on said assembly adjacent each wheel, brake means for each disc comprising a housing connected at spaced points to said frame for relative lateral, longitudinal and torsional movement with respect thereto, said housing having a torque arm connected to said assembly, a fulcrum block movably mounted in said housing, power means, and a brake lever fulcrumed from said block, operatively connected to said power means, and supporting a braking element for engagement with a face of the adjacent disc.

4. In a railway car truck, a supporting wheel and axle assembly having a rotating member with radial braking faces, a truck frame supported from said assembly, and braking means comprising a housing resiliently supported from said frame with a torque arm connected to said assembly, and brake rigging within said housing including a fulcrum block movably mounted therein, power means, and a pair of brake levers fulcrumed at opposite ends of said block, operatively connected to said power means at corresponding ends and projecting from said housing and supporting braking elements for engagement with said faces.

5. In a railway car truck, a wheel and axle assembly having a rotating member with a radial braking face, a truck frame spring-supported from said assembly, and braking means comprising a housing supported from said frame and having a torque arm eccentrically connected to said assembly, a pivoted fulcrum block, a brake lever, and power means therefor in said housing, said brake lever being pivotally fulcrumed from said block, operatively connected to said power means, and projecting from said housing and supporting a braking element in engagement with said face.

6. In a railway car truck, a wheel and axle assembly, a truck frame spring-supported therefrom, brake discs with radial braking faces on said assembly adjacent each wheel, brake means for each disc comprising a housing connected to said truck frame and having a torque arm connected to said assembly, a fulcrum block pivoted in said housing, a pair of levers fulcrumed from said block, and power means operatively connected to said levers, each of said levers pivotally supporting a braking element for engagement with an adjacent face.

7. In a railway car truck, a wheel and axle assembly, a truck frame spring-supported therefrom, brake discs with radial braking faces on said assembly adjacent each wheel, brake means for each disc comprising a housing connected to said truck frame and having a torque arm connected to said assembly, a fulcrum block movably mounted in said housing, a pair of levers fulcrumed from said block, power means operatively connected to said levers, each of said levers supporting a braking element for engagement with an adjacent face, and balancing means for each of said elements.

8. In a railway car truck, a wheel and axle assembly having spaced rotating means with braking faces, a truck frame supported from said assembly, and brake means for each rotating means comprising a housing supported from said frame with a torque arm connected to said assembly, a fulcrum block pivoted in said housing, power means, and a brake lever fulcrumed from said block, operatively connected to said power means and supporting a braking element for engagement with an adjacent face.

9. In a raiway car truck, a wheel and axle assembly having thereon spaced pairs of radial braking faces, a truck frame supported from said assembly, and brake means for each pair comprising a housing supported from said frame with a torque arm connected to said assembly, a fulcrum block pivoted in said housing, power means, and brake levers fulcrumed from said block, operatively connected to said power means and supporting braking elements.

10. In a railway car truck, a wheel and axle assembly, a truck frame spring-supported therefrom, brake discs with radial braking faces on said assembly adjacent each wheel, brake means for each disc comprising a housing resiliently connected to said truck frame and having a torque arm connected to said assembly, a fulcrum block pivoted in said housing, a pair of levers fulcrumed from said block, and power and hand brake means operatively connected to said levers.

11. In a railway car truck, a wheel and axle assembly, a truck frame spring-supported therefrom, brake discs with radial braking faces on said assembly adjacent respective wheels, brake means for each disc comprising a housing supported from said truck frame and having a torque arm connected to said assembly, a fulcrum block pivoted in said housing, a pair of levers fulcrumed from said block and power and release means operatively connected to said levers.

12. In a railway car truck, a wheel and axle assembly, a truck frame supported therefrom, brake discs with radial braking faces on said assembly adjacent each wheel, brake means for each disc comprising a housing connected to said frame, said housing having a torque arm connected to said assembly, a fulcrum block pivoted in said housing, a brake lever fulcrumed from said block, and an auxiliary lever fulcrumed from said block for actuation of said brake lever.

13. In a brake arrangement for a vehicle comprising a frame spring-supported from a wheel and axle assembly, a brake surface rotatable with said assembly, braking means transversely movable and eccentrically supported with respect to said assembly, and a torque connection between said means and said assembly, said braking means comprising a pivoted fulcrum block and a brake lever fulcrumed therefrom for support of a friction element in engagement with said surface.

14. In a brake arrangement for a vehicle comprising a frame supported from a wheel and axle assembly, braking surfaces rotatable with said assembly, braking means transversely movable and eccentrically supported with respect to said assembly, and a torque connection between said means and said assembly, said braking means comprising a pivoted block and a plurality of brake levers operatively fulcrumed thereon and carrying friction elements for engagement with said surfaces.

15. In a railway car truck, a wheel and axle, a truck frame spring-supported therefrom, brake discs with radial braking faces on said assembly adjacent each wheel, brake means for each disc comprising a housing connected to said truck frame and having a torque arm connected to said assembly, a fulcrum block pivoted in said housing, a pair of levers fulcrumed from said block, and power means operatively connected to said levers.

16. In a brake assembly for a railway car truck having sprung and unsprung members, a rigid frame movably supported between said members and carrying braking means for engagement with a brake surface on one of said members, and a fulcrum block mounted on said rigid frame, said block affording pivotal support for a brake lever, and yielding means for restraining the movement of said block.

17. In a brake assembly for a railway car truck having sprung and unsprung members, a rigid frame connected between said members and movable with respect to both, said frame supporting braking means for engagement with a brake surface on one of said members, and a fulcrum block pivoted on said rigid frame, a brake lever on said block, yielding means for restraining the pivotal movement of said block, and stop means on said rigid frame and said block limiting the pivotal movement thereof.

18. In a brake arrangement, a rigid frame connected between sprung and unsprung members of a railway car truck and affording support for a plurality of brake levers carrying braking elements for engagement with braking faces on one of said members, said support comprising means pivoted on said frame to rotate in a single plane, and yieldable means restraining relative movement of said pivoted means and said rigid frame.

19. In a brake arrangement, a rigid frame connected between sprung and unsprung members of a vehicle, said frame having means mounting a brake lever with a braking element for engagement with a braking face on one of said members, said mounting means comprising a member supported on said frame to rotate in one plane and supporting said brake lever to rotate in a different plane.

20. In a brake arrangement, a rigid frame connected between sprung and unsprung members of a vehicle, said frame having means mounting a brake lever with a braking element for engagement with a braking face on one of said members, said mounting means comprising a member rotatable in a given plane with respect to said frame and supporting said lever to permit rotation in a different plane.

WALTER H. BASELT.

REFERENCES CITED

The following references are of record in the file of this patent:

UNITED STATES PATENTS

| Number | Name | Date |
|---|---|---|
| 1,531,285 | Hodgkinson | Mar. 31, 1925 |
| 1,838,820 | Frank | Dec. 29, 1931 |
| 1,895,772 | Rosenberg | Jan. 31, 1933 |
| 1,940,845 | Conner et al. | Dec. 26, 1933 |
| 2,174,402 | Farmer | Sept. 26, 1939 |
| 2,343,342 | Tack | Mar. 7, 1944 |
| 2,355,120 | Tack | Aug. 8, 1944 |
| 2,355,122 | Tack | Aug. 8, 1944 |